United States Patent
Wang et al.

(10) Patent No.: US 7,595,609 B2
(45) Date of Patent: Sep. 29, 2009

(54) BATTERY SYSTEM POWER PATH CONFIGURATION AND METHODS FOR IMPLEMENTING SAME

(75) Inventors: Ligong Wang, Round Rock, TX (US); John J. Breen, Harker Heights, TX (US)

(73) Assignee: Dell Products L.P., Round Rock, TX (US)

( * ) Notice: Subject to any disclaimer, the term of this patent is extended or adjusted under 35 U.S.C. 154(b) by 382 days.

(21) Appl. No.: 11/371,790

(22) Filed: Mar. 9, 2006

(65) Prior Publication Data

US 2007/0210751 A1 Sep. 13, 2007

(51) Int. Cl.
*H02J 7/00* (2006.01)
*H02J 7/04* (2006.01)
*G01N 27/416* (2006.01)
*G08B 21/00* (2006.01)

(52) U.S. Cl. .................. 320/134; 320/132; 320/149; 320/155; 324/426; 340/636.1; 340/636.21

(58) Field of Classification Search .................. 320/134, 320/132
See application file for complete search history.

(56) References Cited

U.S. PATENT DOCUMENTS

| | | | |
|---|---|---|---|
| 5,557,188 A | 9/1996 | Piercey | |
| 6,130,813 A | 10/2000 | Kates et al. | |
| 6,603,286 B2 | 8/2003 | Herrmann et al. | |
| 6,617,063 B1 | 9/2003 | Ohnishi | |
| 6,920,341 B2 | 7/2005 | Fukunishi | |
| 2002/0011823 A1 | 1/2002 | Lee | |
| 2003/0057918 A1 | 3/2003 | Aoki et al. | |
| 2004/0251877 A1 | 12/2004 | Lee | |
| 2004/0263123 A1 | 12/2004 | Breen et al. | |
| 2005/0029986 A1 | 2/2005 | Morgan | |
| 2005/0077878 A1* | 4/2005 | Carrier et al. | 320/134 |
| 2005/0156574 A1* | 7/2005 | Sato et al. | 320/134 |

* cited by examiner

*Primary Examiner*—Edward Tso
*Assistant Examiner*—Yalkew Fantu
(74) *Attorney, Agent, or Firm*—O'Keefe, Egan, Peterman & Enders LLP

(57) ABSTRACT

A battery system may be provided with a battery charge current path that is different from the battery discharge current path of the battery system, for example, by providing no controlled charge circuitry (e.g., providing no C-FETs) in the discharge current path of the battery system to avoid the power loss experienced across the C-FETs of a conventional battery system during battery system discharging operations.

20 Claims, 6 Drawing Sheets

BATTERY SYSTEM POWER PATH CONFIGURATION AND METHODS FOR IMPLEMENTING SAME

BACKGROUND OF THE INVENTION

1. Field of the Invention

This invention relates generally to battery systems, and more particularly to power paths in a battery system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of portable information handling systems include notebook computers. These portable electronic devices are typically powered by battery systems such as lithium ion ("Li-ion") or nickel metal hydride ("NiMH") battery packs including one or more rechargeable batteries. FIG. 1 shows a battery system 120 of a portable information handling system 100 having battery charge terminals 122, 124 that are temporarily coupled to corresponding charge output terminals 115, 116 of a battery charging apparatus 110. As so configured, battery charging apparatus 110 is coupled to receive current from current supply terminals 112, 114 (e.g., alternating current, or direct current from an AC adapter) and to provide DC charging current to battery charge terminals 122, 124 of battery system 120 via charge output terminals 115, 116. As shown, battery system 120 also includes battery system data bus (SMBus) terminals 126, 128 for providing battery state information, such as battery voltage, to corresponding battery charging apparatus data bus terminals 117, 118.

FIG. 2 shows a conventional lithium ion battery system 120 having a battery management unit ("BMU") 202 responsible for monitoring battery system operation and for controlling battery system charge and discharge circuitry 270 that is present to charge and discharge one or more battery cells of the battery system. As shown, BMU 202 includes analog front end ("AFE") 206 and microcontroller 204. Charge and discharge circuitry 270 of battery system 120 includes two field effect transistors ("FETs") 214 and 216 coupled in series between battery charge terminal 112 and battery cell/s 224. FET 214 is a charge FET ("C-FET") switching element that forms a part of charge circuit 260 that is controlled by microcontroller 204 and/or AFE 206 of BMU 202 using switch 218 to allow or disallow charging current to the lithium ion battery cell/s 224, and FET 216 is a discharge FET ("D-FET") switching element that forms a part of discharge circuit 262 coupled in series with charge circuit 260 that is controlled by microcontroller 204 and/or AFE 206 of BMU 202 using switch 220 to allow or disallow discharge current from the battery cell/s 224. As shown, parasitic diodes are present across the source and drain of each FET switching element, i.e., to conduct charging current to the battery cell/s when the discharge FET switching element 216 is open, and to conduct discharging current from the battery cell/s when the charge FET switching element 214 is open.

During normal battery pack operations both charge and discharge FET switching elements 214 and 216 are placed in the closed state by respective switches 218 and 220, and cell voltage detect circuitry 210 of AFE 206 monitors voltage of battery cell/s 224. If cell voltage detect circuitry 210 of AFE 206 detects a battery over-voltage condition, BMU 202 opens the charge FET switching element 214 to prevent further charging of the battery cell/s until the over-voltage condition is no longer present. Similarly, if the cell voltage detect circuitry 210 of AFE 206 detects a battery under-voltage (or over-discharge) condition, BMU 202 opens the discharge FET switching element 216 to prevent further discharging of the battery cell/s until the under-voltage condition is no longer present. BMU 202 may also open the charge FET switching element 214 when the battery pack is in sleep mode.

A current sense resistor 212 is present in the battery pack circuitry to allow current sensor 208 of AFE 206 to monitor charging current to the battery cell/s. If the charge FET switching element 214 is supposed to be open (e.g., during sleep mode or battery over-voltage condition) but charging current is detected, BMU 202 permanently disables the battery pack by blowing an inline fuse 222 present in the battery circuitry to open the battery pack circuitry and prevent further over-charging.

FIG. 3 shows a battery charging apparatus 110 coupled to a conventional smart battery system 120 for a notebook computer that includes four power FETs 214a, 214b, 216a, 216b. As shown, charging apparatus 110 includes charger circuitry 304 that is coupled to receive current from current supply terminals 112, 114, and to provide DC charging current to battery charge terminals 122, 124 of battery system 120 via charge output terminals 115, 116. Also shown is notebook computer system load 330 that is coupled to receive power from battery system 120 via coupled terminals 122 and 115. Charger circuitry includes charger regulation circuitry such as an analog controller with some digital functionality, and is configured to communicate with BMU 202 and/or through system BIOS of the notebook computer. BMU 202 turns C-FETs (214a and 214b) and D-FETs (215a and 215b) OFF and/or ON based on system operating conditions. Not shown in charge circuit 260 and discharge circuit 262 are switches 218 and 220 of FIG. 2, which are optional and may be alternatively present as switches in the BMU as part of AFE.

As shown in FIG. 3, battery system 120 includes SMBus terminals 126, 128 for providing battery state information, such as battery voltage and current, via battery charging apparatus data bus terminals 117, 118 to system embedded controller/keyboard controller (EC/KBC) 331. As further shown in FIG. 3, charge output terminal 115 is the only positive (Batt+) power line pin that is connected to the smart battery system 120. During discharge operations of battery system 120, power loss is experienced across the C-FETs 214 of charge circuit 260. Two C-FETs 214 are provided in FIG. 3 in order to reduce the risk of C-FET burning under conditions of high battery discharge current through charge circuit 260.

SUMMARY OF THE INVENTION

Disclosed herein are systems and methods for providing a power path in a battery system (e.g., smart battery system or dumb battery system). In one embodiment, a battery system may be provided with a battery charge current path that is different from the battery discharge current path of the battery system. By so providing a battery system charge current path that is different from the battery system discharge current path, reduced power loss characteristics during battery system discharge may be advantageously achieved as compared to the power loss characteristics of a conventional battery system during battery system discharge operations. This advantageous characteristic may be accomplished, for example, by providing no controlled charge circuitry (e.g., providing no C-FETs) in the discharge current path of the battery system and, in one exemplary embodiment, by providing only discharge circuitry (e.g., providing one or more D-FETs) in the discharge current path of the battery system. In such an embodiment, the power loss across the C-FETs of a conventional battery system during battery system discharging operations may be advantageously avoided, and battery life therefore extended, e.g., to provide about 2% extended runtime. Further advantageously, the safety risk of C-FET component failure is reduced because no current is conducted through C-FETs during battery system discharging operations.

In a further exemplary embodiment of the disclosed systems and methods, only one C-FET may be provided in the separate charge path of a battery system since there is no need for inclusion of a second C-FET to handle high discharge currents and prevent burning of the C-FET when no discharge current will be conducted through the C-FET. This advantageously reduces the cost and complexity of the battery system.

The disclosed systems and methods may be implemented to provide a battery charge current path that may be utilized for any type of battery charging operation and/or algorithm including, but not limited to, conventional (e.g., full charge current) charging operations, trickle charging operations, pre-charge operations, etc., or combinations thereof.

In one respect, disclosed herein is a battery system, including: one or more battery cells; a charge current path coupled between a first battery system terminal and the one or more battery cells, and a discharge current path coupled between a second battery system terminal and the one or more battery cells, the first battery system terminal being different than the second battery system terminal. In this system embodiment, the charge current path coupled to the first battery system terminal is a different current path than the discharge current path coupled to the second battery system terminal.

In another respect, disclosed herein is a portable information handling system, including: a battery system that includes one or more battery cells and battery current control circuitry, the battery control circuitry including charge circuitry and discharge circuitry. In this system embodiment, the charge circuitry is included in a charge current path between the one or more battery cells and a first battery system terminal, the first battery system terminal being configured for coupling to receive charge current from a battery charging apparatus. The discharge circuitry is included in a discharge current path between the one or more battery cells and a second battery system terminal, the second battery system terminal being coupled to provide discharge current to a system load of the portable information handling system. The first battery system terminal is different than the second battery system terminal, and the charge current path coupled to the first battery system terminal is a different current path than the discharge current path coupled to the second battery system terminal.

In another respect, disclosed herein is a method of charging and discharging a battery system having one or more battery cells, including: providing charge current to the battery cells through a charge current path that is coupled between a first battery system terminal and the one or more battery cells; and providing discharge current from the battery cells through a discharge current path that is coupled between a second battery system terminal and the one or more battery cells, the first battery system terminal being different than the second battery system terminal. In this method embodiment, the charge current path coupled to the first battery system terminal is a different current path than the discharge current path coupled to the second battery system terminal.

DESCRIPTION OF ILLUSTRATIVE EMBODIMENTS

Figure 4:
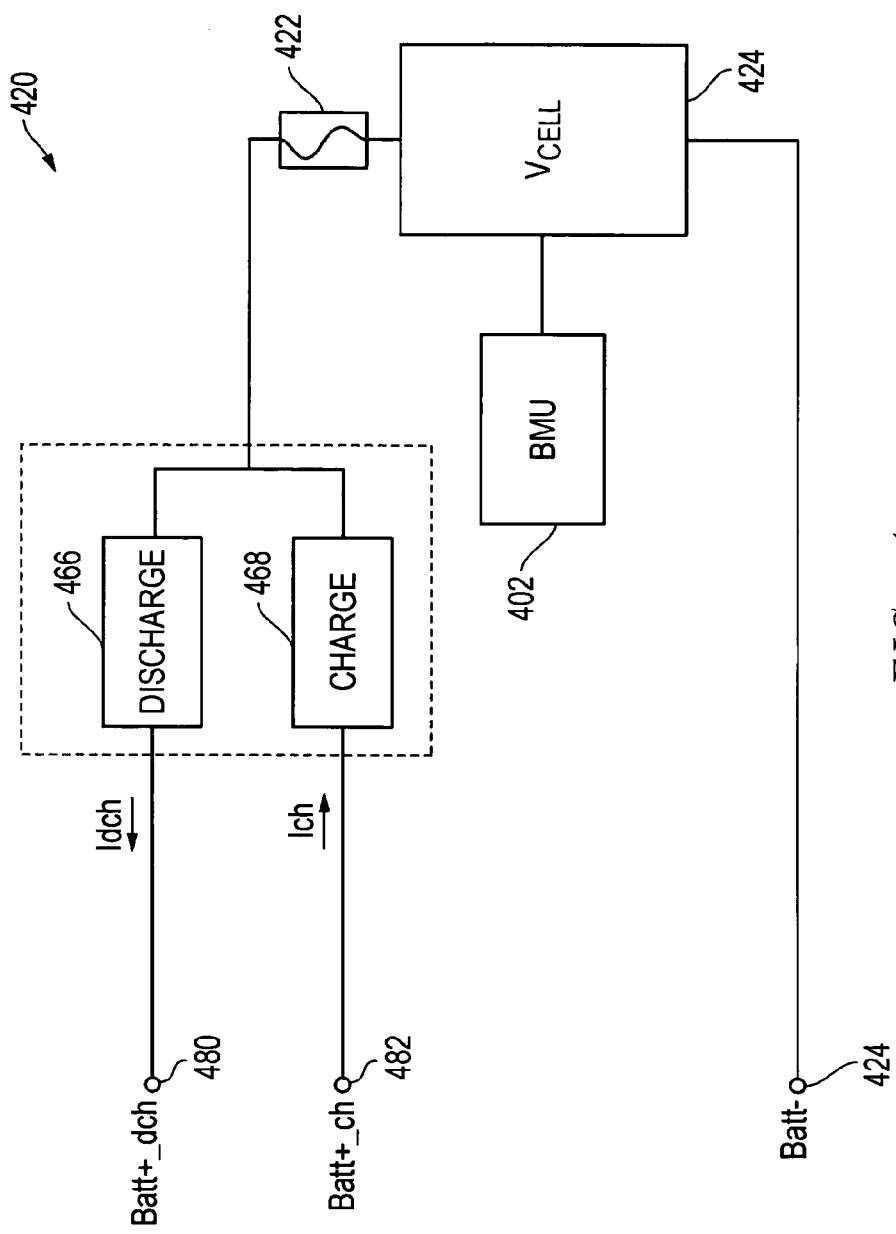
FIG. 4 is a block diagram of a battery system according to one embodiment of the disclosed systems and methods.

FIG. 4 shows a smart battery system 420 according to one embodiment of the disclosed systems and methods. Battery system 420 may be configured as a stand alone source of DC current, or may be provided as a permanent or replaceable component of a portable electronic device (e.g., battery pack of a portable information handling system such as a notebook computer). Besides notebook computers, other examples of such portable electronic devices include, but are not limited to, portable telephone devices (e.g., cellular phones, cordless phones, etc.), personal digital assistant ("PDA") devices, MP3 players, cameras, medical devices, computer peripherals, etc. In addition to portable electronic devices, it will be understood that the disclosed systems and methods may be implemented to power any other type of electronic device or system load that is at least partially battery powered and that has electronic circuitry that is coupled to receive current from a battery system. In this regard, the disclosed systems and methods may be advantageously implemented in applications where smart batteries are employed. In one exemplary embodiment, battery system 420 may be configured as a smart battery system for a portable information handling system. However, the disclosed systems and methods may be also be implemented to control charging and/or discharging operations for dumb battery systems (i.e., battery systems configured to be controlled externally rather than internally).

As shown in FIG. 4, battery system 420 includes one or more battery cell/s 424 coupled to battery system terminal 480 that may be configured to be coupled to a system load (not shown) and battery system terminal 482 that may be configured to be coupled to a battery charging apparatus (not shown). It will be understood that when battery system 420 is provided as an integrated component of an electronic device, a corresponding battery charging apparatus and/or system load may also be provided as integrated parts of the same electronic device, or may be provided as external devices to the electronic device. Battery cell/s 424 may be any type of rechargeable battery cell/s or combination thereof. Examples of such battery cells include, but are not limited to, Li-ion battery cells, NiMH battery cells, nickel cadmium (NiCd) battery cells, lithium-polymer (Li-polymer) battery cells, etc.

Figure 5:
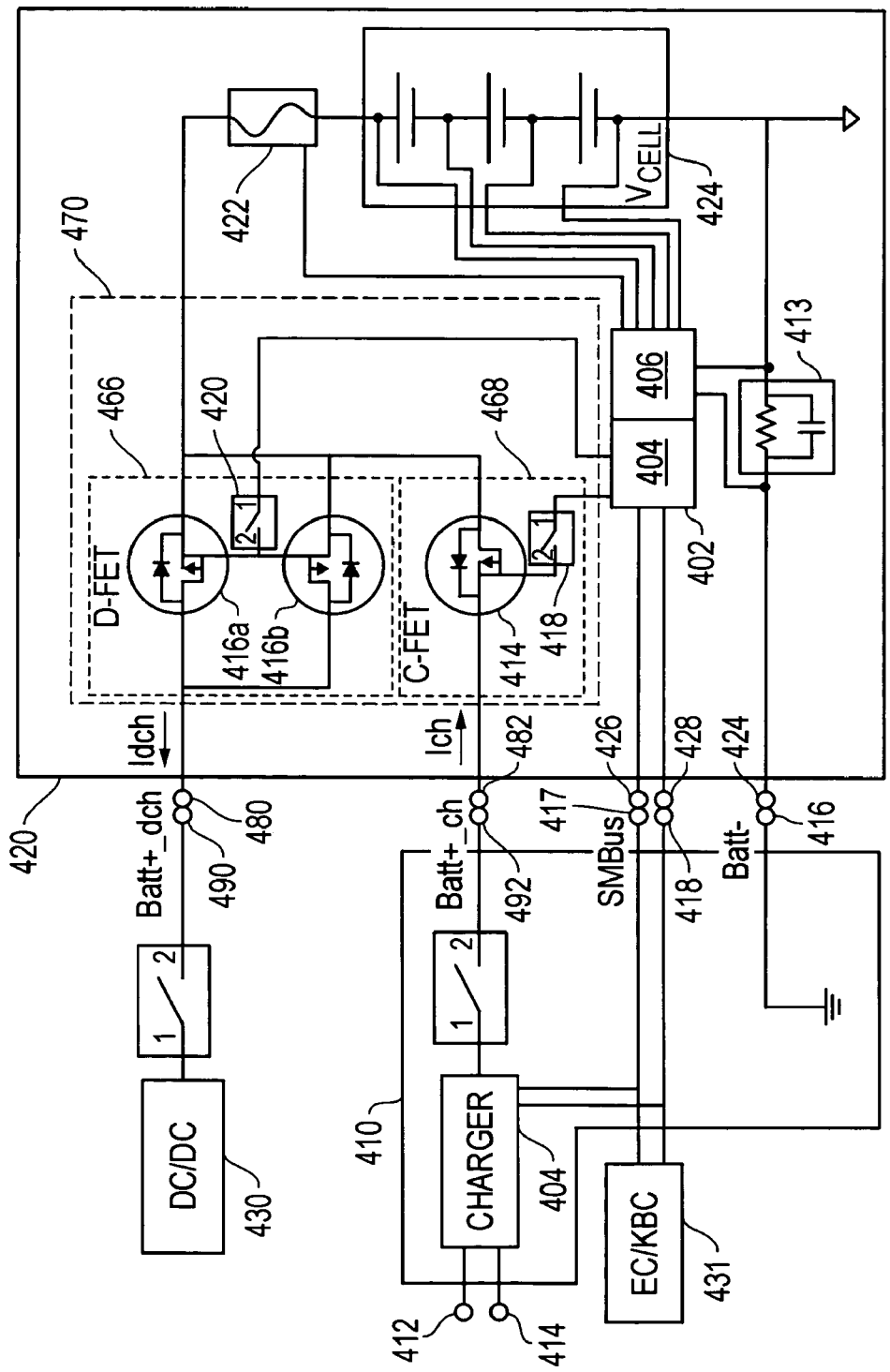
FIG. 5 is a block diagram of a battery system according to one embodiment of the disclosed systems and methods.

Battery system 420 of FIG. 4 is also shown provided with bifurcated battery current control circuitry 470 that is present to control flow of charging current to battery cell/s 424 of battery system 420 and to also control flow of discharge current from battery cell/s 424 of battery system 420. As shown, battery current control circuitry 470 includes discharge circuitry in the form of discharge circuit 466 and separate charge circuitry in the form of charge circuit 468. When battery system 420 is coupled to battery charging apparatus and system load as illustrated in FIG. 5, discharge circuit 466 forms a uni-directional portion of the discharge current path between battery cell/s 424 and Batt+_dch terminal 480 (i.e., in which current flows only in the direction of Idch that is different from the uni-directional portion of the charge current path that is formed by charge circuit 468 between battery cell/s 424 and Batt+_ch terminal 482 (i.e., in which current flows only in the direction of Ich). In this regard, the term "uni-directional portion" refers to a portion of a current path in which current is allowed to flow in only one direction at all times and never in the opposite direction.

FIG. 5 shows a battery charging apparatus 410 coupled to smart battery system 420 according to one exemplary embodiment of the disclosed systems and methods. As shown, charging apparatus 410 includes charger circuitry 404 that is coupled to receive current from current supply terminals 412, 414, and to provide DC charging current to battery system terminals 482, 424 of battery system 420 via charge output terminals 492, 416. Also shown is system load 430 (e.g., notebook computer system load) that is coupled to receive power from battery system 420 via coupled battery system terminals 480 and 490.

As shown in FIG. 5, battery system 420 may include one or more battery cell/s 424 coupled to battery terminal 480 via discharge circuit 466 of battery current control circuitry 470 and coupled to battery terminal 482 via charge circuit 468 of battery current control circuitry 470. As shown, discharge circuit 466 includes two switching elements in the form of D-FETs 416a and 416b coupled in parallel, and charge circuit 468 includes a single switching element in the form of C-FET 414. As further shown, discharge circuit 466 is coupled to form a uni-directional portion of the discharge current path between battery cell/s 424 and system load 430 that is different from the uni-directional portion of the charge current path that is formed by charge circuit 468 as it is coupled between battery cell/s 424 and charger circuitry 404 of charging apparatus 410. As previously described, charger circuitry 404 is coupled to receive current from current supply terminals 412, 414, and to provide DC charging current to battery system terminals 482, 424 of battery system 420 via charge output terminals 492, 416. System load 430 is coupled to receive power from battery system 420 via coupled terminals 480 and 490.

Figure 1:
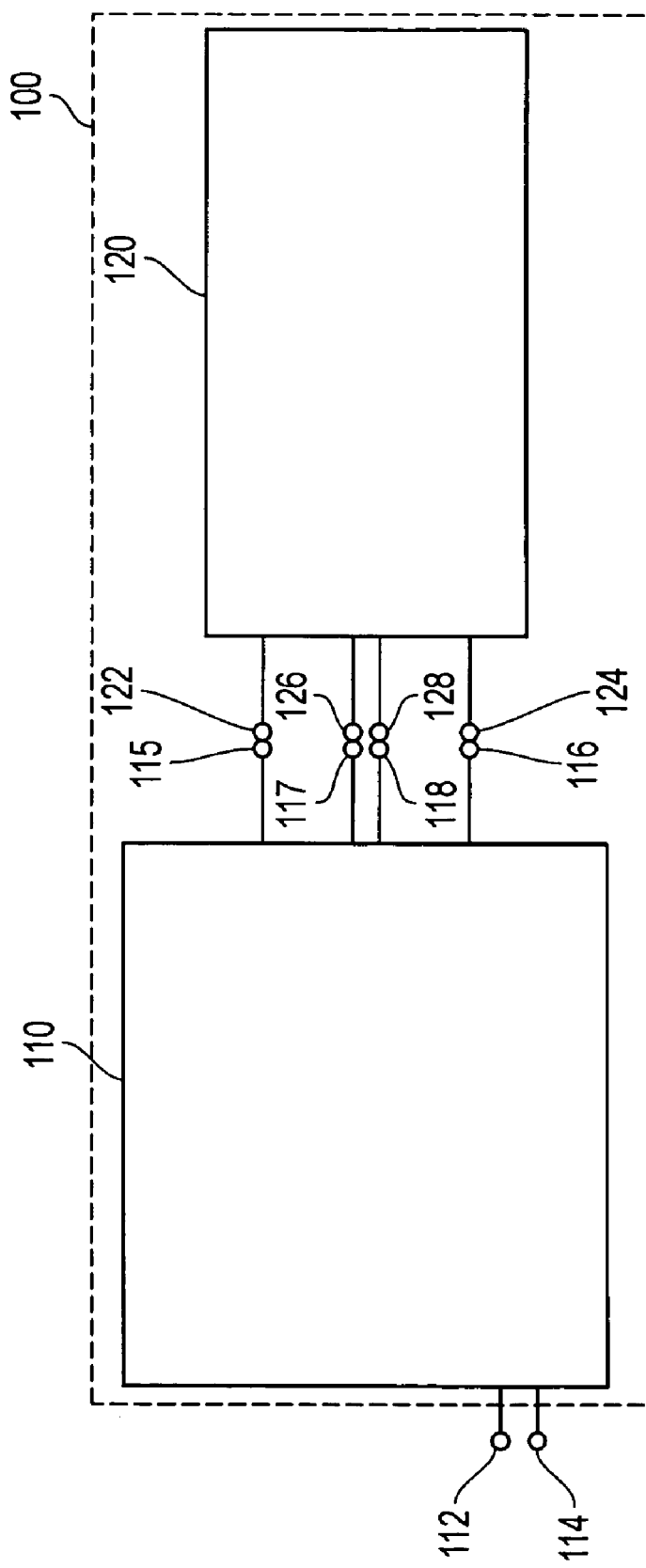
FIG. 1 is a block diagram of a conventional portable electronic device and battery charging apparatus.
Figure 2:
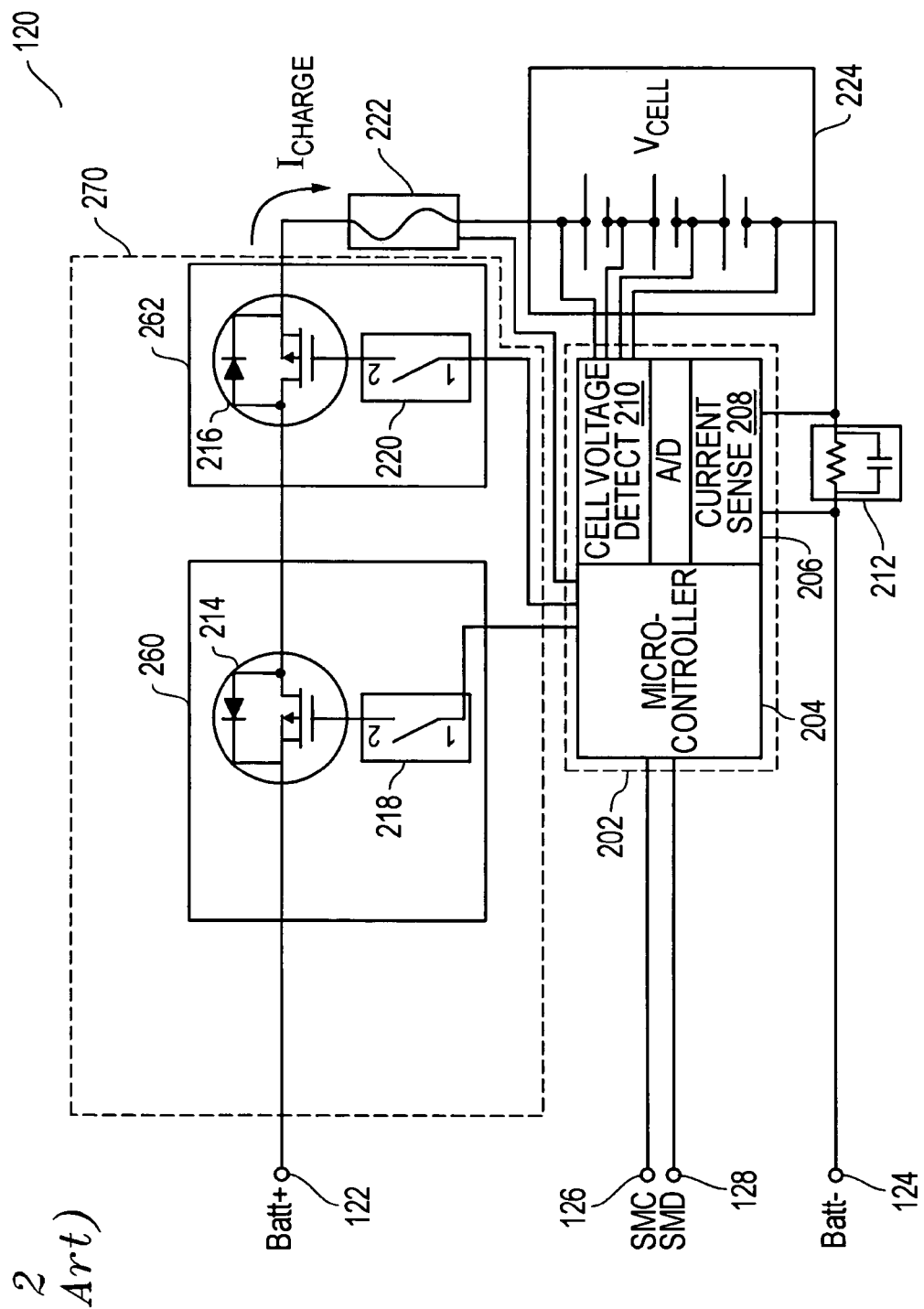
FIG. 2 is a block diagram of a conventional lithium ion battery system.
Figure 3:
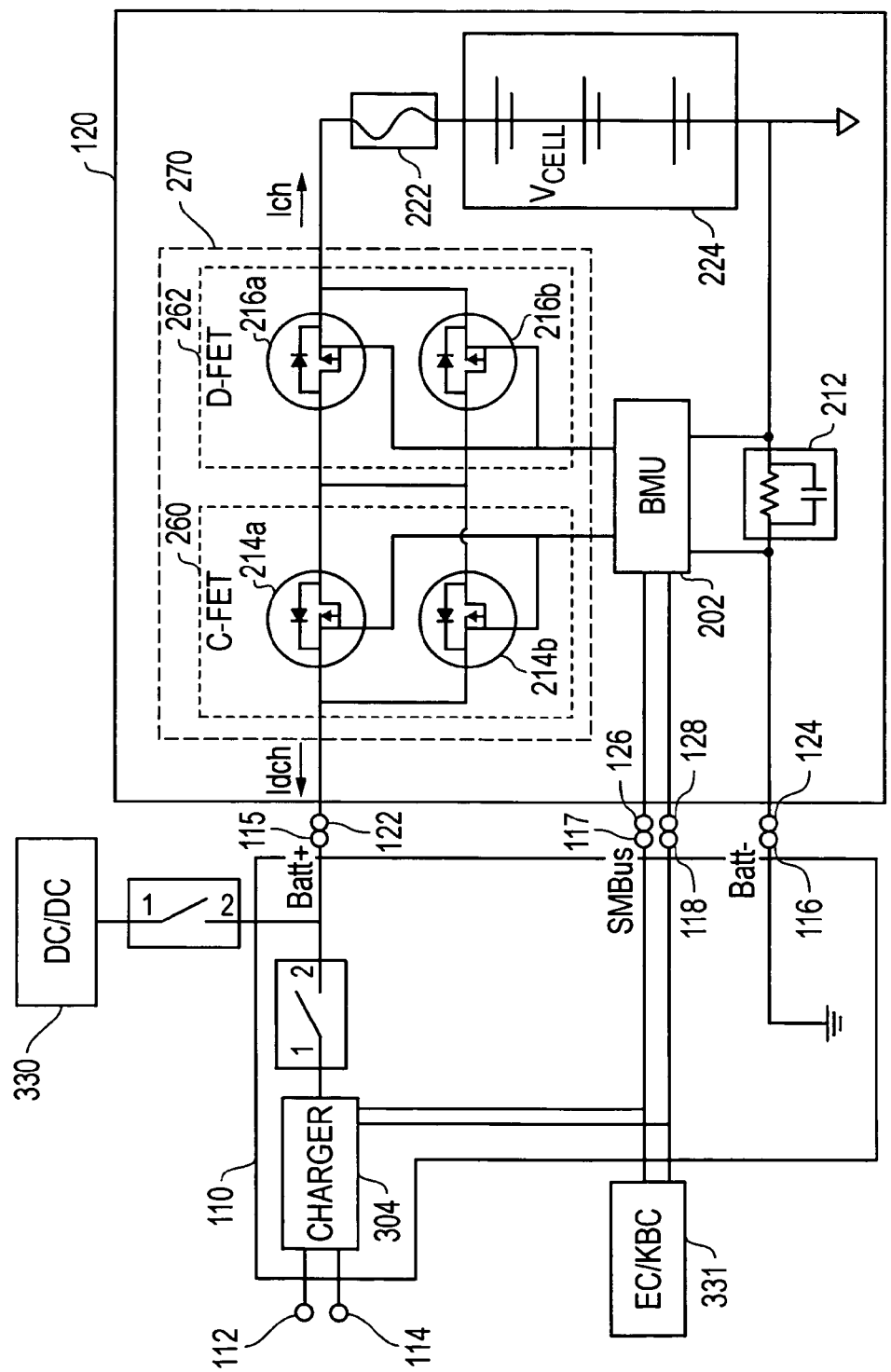
FIG. 3 is a block diagram of a conventional lithium ion battery system.

In the illustrated configuration, battery system 420 of FIG. 5 is provided with separate charge and discharge paths for battery system 420, and two separate and respective Batt+ pins are provided, i.e., Batt+_ch pin of terminal 482 coupled to receive charge current from charger circuitry 404 and Batt+_dch pin of terminal 480 coupled to provide discharge current to system load 430. This configuration is in contrast to the conventional configuration of FIGS. 1-3 in which a single Batt+ pin provided by terminal 122 operates as a bi-directional power line by both conducting charge current to battery system 120 and conducting discharge current from battery system battery system 120.

Referring again to the embodiment of FIG. 5, since a separate discharge current path through discharge circuit 466 is provided via (Batt+_dch) pin of terminal 480, no power loss is experienced across C-FET 414 of charge circuit 468 during current discharge operations of battery system 420. Although more than one C-FET may be optionally provided in a charge circuit of the disclosed systems and methods, a single C-FET 414 may be employed in charge circuit 468 without concern of risk of C-FET burning under conditions of high battery discharge current from system 420 since no discharge current passes through charge circuit 468. Although parasitic diodes are shown present across the source and drain of each FET switching element, their presence is not required because each FET switching element is coupled in a uni-directional portion of its respective current path.

In the embodiment of FIG. 5, charger circuitry 404 may include charger regulation circuitry such as an analog controller with some digital functionality, and may be configured to communicate with BMU 402 and/or through system BIOS (e.g., running on EC/KBC 431) of the notebook computer. BMU 402 may be configured to turn C-FET 414 and D-FETs (416a and 416b) OFF and/or ON based on system operating conditions in a manner described further herein. As further shown in FIG. 5, battery system 420 includes SMBus terminals 426, 428 for providing battery state information, such as battery voltage and current, via battery charging apparatus data bus terminals 417, 418 to system embedded controller/keyboard controller (EC/KBC) 431.

In the illustrated embodiment, battery management unit (BMU) 402 is responsible for monitoring battery system operation (e.g., monitoring voltage, current, temperature, etc.) and for controlling battery current control circuitry 470, although any other suitable configuration of circuitry, processor/s and/or control logic may be employed in other embodiments. In the embodiment of FIG. 5, BMU 402 includes AFE 406 and microcontroller 404, although other embodiments are possible. In this embodiment, C-FET 414 is controlled by microcontroller 404 and/or AFE 406 of BMU 402 using optional charge circuit switch 418 to allow or disallow charging current to battery cell/s 324, and C-FET 416 is a discharge FET switching element that is controlled by microcontroller 404 and/or AFE 406 of BMU 402 using optional discharge circuit switch 420 to allow or disallow discharge current from the battery cell/s 424, it being understood that the function of switches 418 and 420 may be performed in any other suitable manner, e.g., as switch circuitry present within AFE 406 of BMU 402. Also shown in FIG. 5 are current sense resistor 413 that may be present to allow BMU to monitor charging current to the battery cell/s, and inline fuse 422 that may be present to prevent over-charging. BMU 402 is also coupled as shown to monitor voltage of battery cell/s 424.

Figure 6:
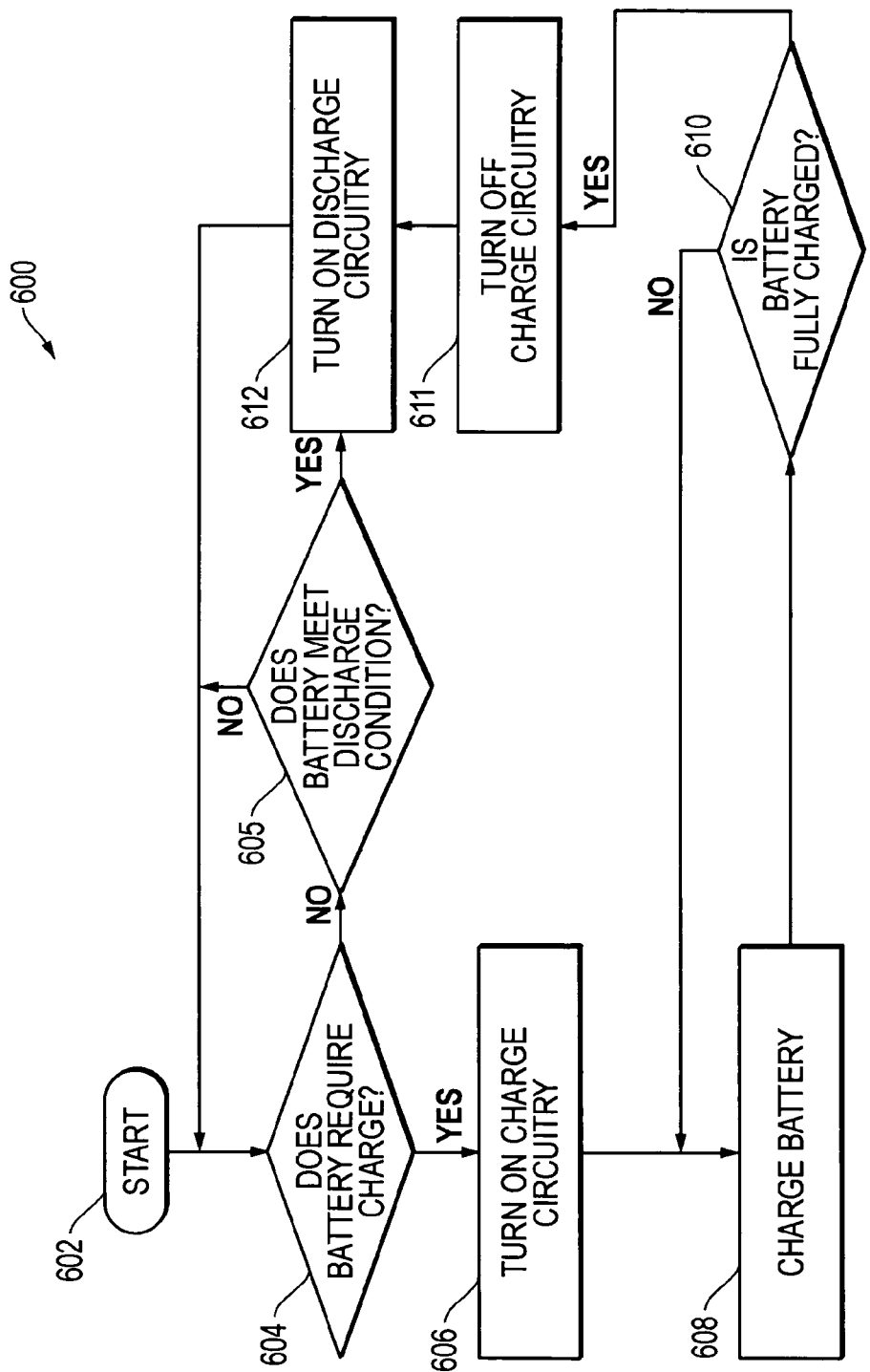
FIG. 6 is a flow diagram illustrating methodology according to another embodiment of the disclosed methods and systems.

FIG. 6 is a flow diagram illustrating one cycle of methodology 600 that may be employed in one exemplary embodiment of the disclosed systems and methods to control a charge circuit and discharge circuitry of a battery system, such as a battery system of a portable information handling system (e.g. notebook computer) or other electronic device. The methodology of FIG. 6 may be implemented, for example, using the battery system embodiment illustrated and described in relation to FIG. 5, e.g., based on control signals received by BMU 402 from embedded controller 431 across SMBus terminals 417, 418 and 426, 428, or based on control signals produced independently by BMU 402. In this regard embedded controller 431 may implement charge circuitry control and discharge circuitry control steps of methodology 600 as part of a repeating cycle that includes other system steps. However, it will be understood that the methodology of FIG. 6 may be implemented using any other suitable configuration of battery system and control circuitry, including battery systems employing FET or non-FET charge switching elements.

Battery system charge and discharge control methodology 600 starts in step 602 during operation of the battery system (e.g., battery system 420 of FIG. 5) with both charge and discharge circuitry in an "off" condition, i.e., so as to not to allow flow of either charge or discharge battery current through charge or discharge terminal. In step 604, charge condition of the battery cell/s (e.g., battery cell/s 424) of the battery system is monitored (e.g., by BMU 402) to determine if the battery cell/s need to be charged. This may be accomplished, for example, by monitoring the voltage of the battery cell/s and by comparing the monitored voltage to a reference voltage that corresponds to a voltage state where charging is desired, or by any other suitable method for determining charge condition of the battery cell/s. If the battery cell/s are determined in step 604 to require charging, the charge circuitry (e.g., charge circuit 468) may be controlled or turned "on" in step 606 to provide charging current to the battery cell/s, and the battery cell/s are charged in step 608. However, if the battery cell/s are determined to not require charging in step 604, methodology 600 proceeds to step 605 where it is confirmed that the battery cell/s meet discharge conditions, e.g., that no failure condition or over-discharge state exists. If discharge conditions are met in sep 605, the discharge circuitry (e.g., discharge circuit 466) is controlled or turned "on" in step 612 so as to allow discharge current to flow from the battery cell/s. If discharge conditions are not met in step 605, methodology 600 repeats to step 604 as shown.

During battery charging operations, charge condition of the battery cell/s is monitored in step 610 (e.g., by BMU 402) to detect when the battery cell/s are fully charged, e.g., by comparing the monitored voltage to a reference voltage that corresponds to a voltage state corresponding to a fully charged battery condition, or by using any other suitable method for determining charge condition of the battery cell/s. The charge circuitry is controlled so that it continues to provide charging current to the battery cell/s in step 608 until a fully charged battery cell condition is detected in step 610. When a fully charged battery cell condition is detected in step 610, the charge circuitry is controlled or turned "off" in step 611 so as to terminate the flow of charging current to the battery cell/s, and the discharge circuitry (e.g., discharge circuit 466) is controlled or turned "on" in step 612 so as to allow discharge current to flow from the battery cell/s. At this time, methodology 600 repeats starting with step 604 in which the charge condition of the battery cell/s of the battery system is monitored.

Still referring to FIG. 6, battery cell discharge operations continue with charge circuitry turned "off" until it is determined in step 604 that the battery cell/s need to be charged again. At this time, the charge circuitry is controlled or turned "on" to once again allow charging current to flow to the battery cells. In one exemplary embodiment the discharge circuitry may be controlled or turned "off" so as to not allow flow of discharge current during charging operations if battery is depleted. However, in another exemplary embodiment, the discharge circuitry may remain "on" during charging operations so as to allow flow of discharge current (e.g., to system load 430) when needed.

It will be understood that the particular order and combination of steps of method 600 is exemplary only, and that any combination of fewer, additional, or alternative steps may be performed in other embodiments that is suitable for controlling battery system charge and/or discharge operations in a manner consistent with the systems and methods disclosed and described elsewhere herein. For example, it is possible that methodology 600 may be begin in step 602 with discharge circuitry already turned "on" to allow discharge current to flow from the battery system. It is also possible in another embodiment that discharge circuitry may be controlled or turned "off" to disallow discharge current flow anytime that the charge circuitry is controlled or turned "on" to allow charging current to flow to battery cell/s of a battery system. In yet another embodiment, discharge circuitry be controlled or turned "on" at all times (i.e., when the battery cell/s are fully charged or are partially charged) except when monitored charge condition of the battery cell/s of the battery system indicates that the battery cell/s are in an undercharged conditions. This may be accomplished, for example, by monitoring the voltage of the battery cell/s (e.g., using BMU 402) and by comparing the monitored voltage to a reference voltage that corresponds to a voltage state where discharge is undesirable, or by any other suitable method for determining charge condition of the battery cell/s. Upon detection of an undercharged battery condition, the discharge circuitry may be controlled or turned "off" to disallow flow of discharge current from the battery cells until the monitored charge condition of the battery cell/s indicate that it is no longer in the undervoltage state. When the battery cell/s are no longer in an undervoltage state, the discharge circuitry may be controlled or turned "on" to again allow flow of discharge current from the battery cell/s.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A battery system, comprising:
   one or more battery cells;
   a first battery system terminal, a second battery system terminal, and a third battery system terminal; and
   a charge current path extending between said first battery system terminal and said one or more battery cells, a discharge current path extending between said second battery system terminal and said one or more battery cells, and a ground path coupled to said third battery system terminal, said first battery system terminal being different than said second battery system terminal and said third battery system terminal being different from each of said first and second battery system terminals;
   wherein said charge current path coupled to said first battery system terminal is a different current path than said discharge current path coupled to said second battery system terminal such that each of said first battery system terminal and said charge current path only conducts charging current to said one or more battery cells and never conducts discharge current from said one or more battery cells and such that each of said second battery system terminal and said discharge current path only conducts discharge current from said one or more battery cells and never conducts charge current to said one or more battery cells.

2. The battery system of claim 1, further comprising battery current control circuitry including charge circuitry and discharge circuitry, said charge circuitry being included in said charge current path, and said discharge circuitry being included in said discharge current path; wherein said charge circuitry comprises at least one charge Field Effect Transistor (C-FET) switching element and said discharge circuitry comprises at least one discharge Field Effect Transistor (D-FET) switching element; wherein said charge current path is a current path through said at least one C-FET switching element and not through said at least one D-FET switching element and wherein said discharge current path is a current path through said at least one D-FET switching element and not through said at least one C-FET switching element such that said C-FET only conducts charging current to said one or more battery cells and never conducts discharge current from said one or more battery cells, and such that said D-FET only conducts discharging current from said one or more battery cells and never conducts charging current to said one or more battery cells.

3. The battery system of claim 1, further comprising battery current control circuitry including charge circuitry and discharge circuitry, said charge circuitry being included in said charge current path, said discharge circuitry being included in said discharge current path, and said discharge current path of said discharge circuitry including no charge circuitry such that no charge circuitry conducts discharge current from said one or more battery cells.

4. The battery system of claim 1, further comprising battery current control circuitry including charge circuitry and discharge circuitry, said charge circuitry being included in said charge current path, and said discharge circuitry being included in said discharge current path; and wherein said discharge circuitry comprises at least one D-FET switching element and said discharge current path is a current path through said at least one D-FET switching element and not through any C-FET switching element such that no C-FET switching element conducts discharge current from said one or more battery cells.

5. The battery system of claim 1, further comprising battery current control circuitry including charge circuitry and discharge circuitry, said charge circuitry being included in said charge current path, and said discharge circuitry being included in said discharge current path and said second terminal is configured for coupling to a system load so that said discharge circuitry forms a uni-directional portion of said discharge current path such that said discharge circuitry only conducts discharging current from said one or more battery cells and never conducts charging current to said one or more battery cells.

6. The battery system of claim 5, wherein said first terminal is configured for coupling to a battery charging apparatus so that said charge circuitry forms a uni-directional portion of said charge current path having a direction that is opposite from the direction of the uni-directional portion of said discharge current path formed by said discharge circuitry such that said charge circuitry only conducts charging current to said one or more battery cells from said battery charging apparatus and never conducts discharge current from said one or more battery cells to said system load, and such that said discharge circuitry only conducts discharging current from said one or more battery cells to said system load and never conducts charging current from said battery charging apparatus to said one or more battery cells.

7. The battery system of claim 1, wherein said battery system comprises a battery pack for a portable information handling system.

8. A portable information handling system comprising:
   a system load;
   one or more battery cells;
   a first battery system terminal, a second battery system terminal, and a third battery system terminal; and
   a charge current path extending between said first battery system terminal and said one or more battery cells, a discharge current path extending between said second battery system terminal and said one or more battery cells, and a ground path coupled to said third battery system terminal, said first battery system terminal being different than said second battery system terminal and said third battery system terminal being different from each of said first and second battery system terminals;
   wherein said charge current path coupled to said first battery system terminal is a different current path than said discharge current path coupled to said second battery system terminal such that each of said first battery system terminal and said charge current path only conducts charging current to said one or more battery cells and never conducts discharge current from said one or more battery cells and such that each of said second battery system terminal and said discharge current path only conducts discharge current from said one or more battery cells and never conducts charge current to said one or more battery cells;
   wherein said battery system further includes battery current control circuitry comprising charge circuitry and discharge circuitry;
   wherein said charge circuitry is included in said charge current path between said one or more battery cells and said first battery system terminal, said first battery system terminal being configured for coupling to receive charge current from a battery charging apparatus such that said charge circuitry only conducts charging current to said one or more battery cells and never conducts discharge current from said one or more battery cells; and wherein said discharge circuitry is included in said discharge current path between said one or more battery cells and said second battery system terminal, said second battery system terminal being coupled to provide discharge current to said system load of said portable information handling system such that said discharge circuitry only conducts discharging current from said one or more battery cells and never conducts charging current to said one or more battery cells.

9. The portable information handling system of claim 8, wherein said discharge circuitry comprises at least one discharge transistor (D-FET) switching element; and wherein said discharge current path is a current path through said at least one D-FET switching element and not through any charge transistor (C-FET) switching element such that no C-FET switching element conducts discharge current from said one or more battery cells.

10. The portable information handling system of claim 8, wherein said charge circuitry comprises at least one C-FET switching element and said discharge circuitry comprises at least one D-FET switching element; wherein said charge current path is a current path through said at least one C-FET switching element and not through any D-FET switching element; and wherein said discharge current path is a current path through said at least one D-FET switching element and not through any C-FET switching element such that said C-FET only conducts charging current to said one or more battery cells and never conducts discharge current from said one or more battery cells, and such that said D-FET only conducts discharging current from said one or more battery cells and never conducts charging current to said one or more battery cells.

11. The portable information handling system of claim 10, wherein said battery system is configured as a smart battery system comprising a battery management unit (BMU) that is coupled to said battery current control circuitry, said BMU being configured to monitor voltage of said one or more battery cells and to control said at least one C-FET switching element to control flow of charging current to said one or more battery cells from said battery charging apparatus and to control said at least one D-FET to control flow of discharge current to said system load from said one or more battery cells.

12. The portable information handling system of claim 11, further comprising an embedded controller; wherein said BMU is configured to be coupled to receive control signals from said embedded controller of said portable information handling system; and wherein said BMU is configured to independently control said at least one C-FET switching element and said at least one D-FET switching element, or is configured to control said at least one C-FET switching element and said at least one D-FET switching element based at least in part on said control signals received from said embedded controller.

13. The portable information handling system of claim 8, wherein said discharge circuitry coupled to said system load of said portable information handling system forms a uni-directional portion of said discharge current path; and wherein said charge circuitry is configured for coupling to said battery charging apparatus to form a uni-directional portion of said charge current path having a direction that is opposite from the direction of said uni-directional portion of said discharge current path formed by said discharge circuitry such that said charge circuitry only conducts charging current from said charging apparatus to said one or more battery cells and never conducts discharge current from said one or more battery cells to said system load, and such that said discharge circuitry only conducts discharging current from said one or more battery cells to said system load and never conducts charging current to said one or more battery cells from said charging apparatus.

14. The portable information handling system of claim 8, wherein said portable information handling system comprises a notebook computer.

15. A method of charging and discharging a battery system having one or more battery cells, comprising:
providing said battery system comprising:
one or more battery cells,
a first battery system terminal, a second battery system terminal, and a third battery system terminal, and
a charge current path extending between said first battery system terminal and said one or more battery cells, a discharge current path extending between said second battery system terminal and said one or more battery cells, and a ground path coupled to said third battery system terminal, said first battery system terminal being different than said second battery system terminal and said third battery system terminal being different from each of said first and second battery system terminals;
providing charge current to said battery cells through said charge current path that is coupled between said first battery system terminal and said one or more battery cells; and
providing discharge current from said battery cells through said discharge current path that is coupled between said second battery system terminal and said one or more battery cells;
wherein said charge current path coupled to said first battery system terminal is a different current path than said discharge current path coupled to said second battery system terminal such that each of said first battery system terminal and said charge current path only conducts charge current to said one or more battery cells and never conducts discharge current from said one or more battery cells and such that each of said second battery system terminal and said discharge current path only conducts discharge current from said one or more battery cells and never conducts charge current to said one or more battery cells.

16. The method of claim 15, further comprising battery current control circuitry including charge circuitry and discharge circuitry, said charge circuitry being included in said charge current path, and said discharge circuitry being included in said discharge current path; and wherein said second battery system terminal is configured for coupling to a system load so that said discharge circuitry forms a uni-directional portion of said discharge current path; and wherein said first terminal is configured for coupling to a battery charging apparatus so that said charge circuitry forms a uni-directional portion of said charge current path having a direction that is opposite from the direction of the uni-directional portion of said discharge current path formed by said discharge circuitry such that said charge circuitry only conducts char in current to said one or more battery cells from said battery charging apparatus and never conducts discharge current from said one or more battery cells to said system load, and such that said discharge circuitry only conducts discharging current from said one or more battery cells to said system load and never conducts charging current from said battery charging apparatus to said one or more battery cells.

17. The method of claim 15, further comprising battery current control circuitry including charge circuitry and discharge circuitry, said charge circuitry being included in said charge current path, and said discharge circuitry being included in said discharge current path; wherein said discharge circuitry comprises at least one D-FET switching element; and wherein said discharge current path is a current path through said at least one D-FET switching element and not through any C-FET switching element such that no C-FET switching element conducts discharge current from said one or more battery cells.

18. The method of claim 15, further comprising battery current control circuitry including charge circuitry and discharge circuitry, said charge circuitry being included in said charge current path, and said discharge circuitry being included in said discharge current path; wherein said discharge current path is coupled between said one or more battery cells and a system load of a portable information handling system; wherein said charge current path is coupled between said one or more battery cells and a battery charging apparatus; wherein said charge circuitry comprises at least one C-FET switching element and said discharge circuitry comprises at least one D-FET switching element; wherein said charge current path is a current path through said at least one C-FET switching element and not through any D-FET switching element; and wherein said discharge current path is a current path through said at least one D-FET switching element and not through any C-FET switching element such that said C-FET only conducts charging current to said one or more battery cells and never conducts discharge current from said one or more battery cells, and such that said D-FET only conducts discharging current from said one or more battery cells and never conducts charging current to said one or more battery cells.

19. The method of claim 18, wherein said battery system is configured as a smart battery system comprising a battery management unit (BMU) that is coupled to said battery current control circuitry; and wherein said method further comprises using said BMU to monitor voltage of said one or more battery cells and to control said at least one C-FET switching element to control flow of said charging current to said one or more battery cells from said battery charging apparatus and to control said at least one D-FET to control flow of said discharge current to said system load from said one or more battery cells.

20. The method of claim 18, wherein said portable information handling system comprises a notebook computer.

\* \* \* \* \*

UNITED STATES PATENT AND TRADEMARK OFFICE
CERTIFICATE OF CORRECTION

PATENT NO. : 7,595,609 B2  Page 1 of 1
APPLICATION NO. : 11/371790
DATED : September 29, 2009
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 526 days.

Signed and Sealed this

Twenty-eighth Day of September, 2010

David J. Kappos
*Director of the United States Patent and Trademark Office*